Figure 1:
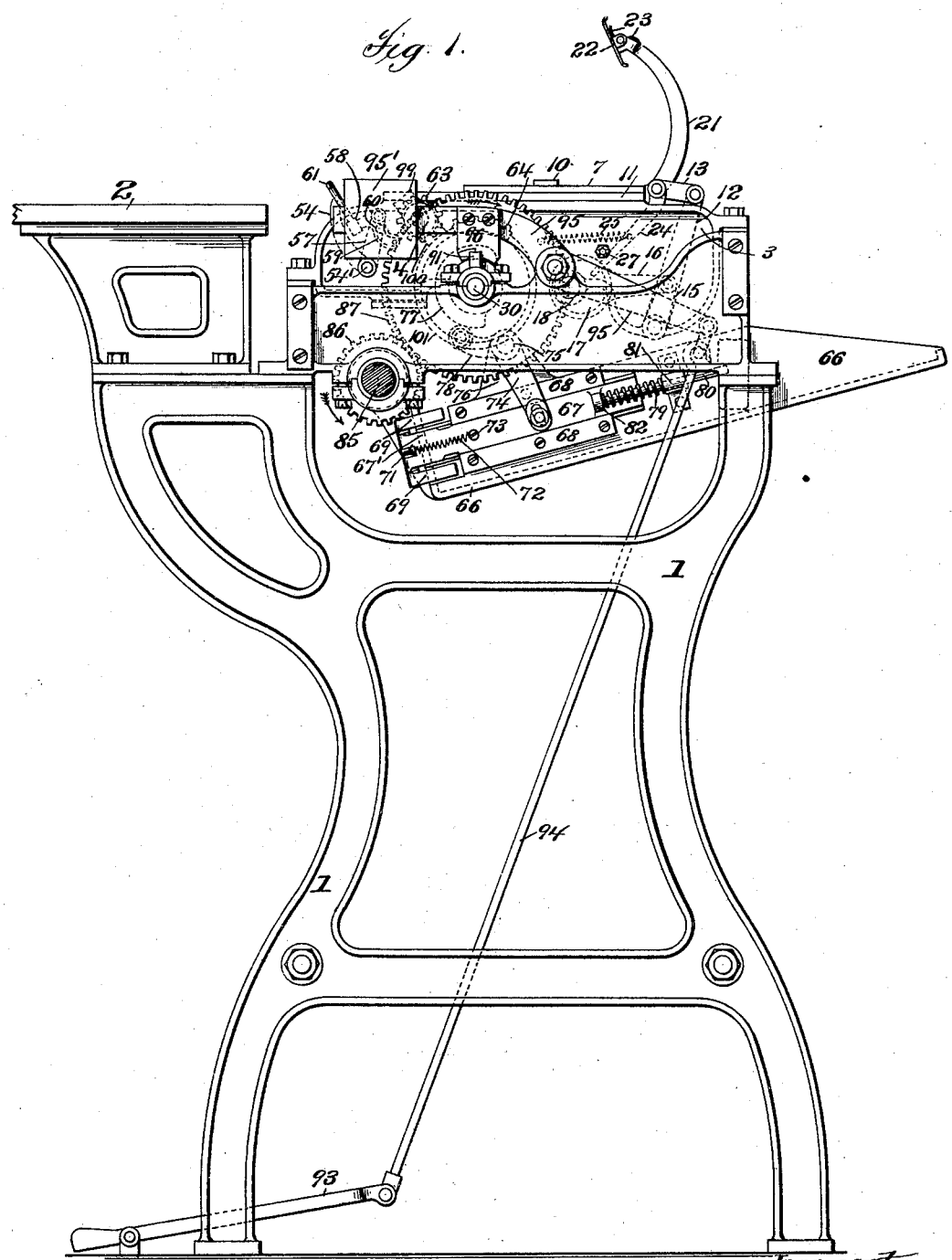

No. 679,811. Patented Aug. 6, 1901.
G. M. WILLIAMS.
MACHINE FOR BOXING CIGARETTES.
(Application filed Mar. 14, 1899. Renewed Dec. 19, 1900.)

(No Model.) 6 Sheets—Sheet 1.

No. 679,811. Patented Aug. 6, 1901.
G. M. WILLIAMS.
MACHINE FOR BOXING CIGARETTES.
(Application filed Mar. 14, 1899. Renewed Dec. 19, 1900.)
(No Model.) 6 Sheets—Sheet 2.
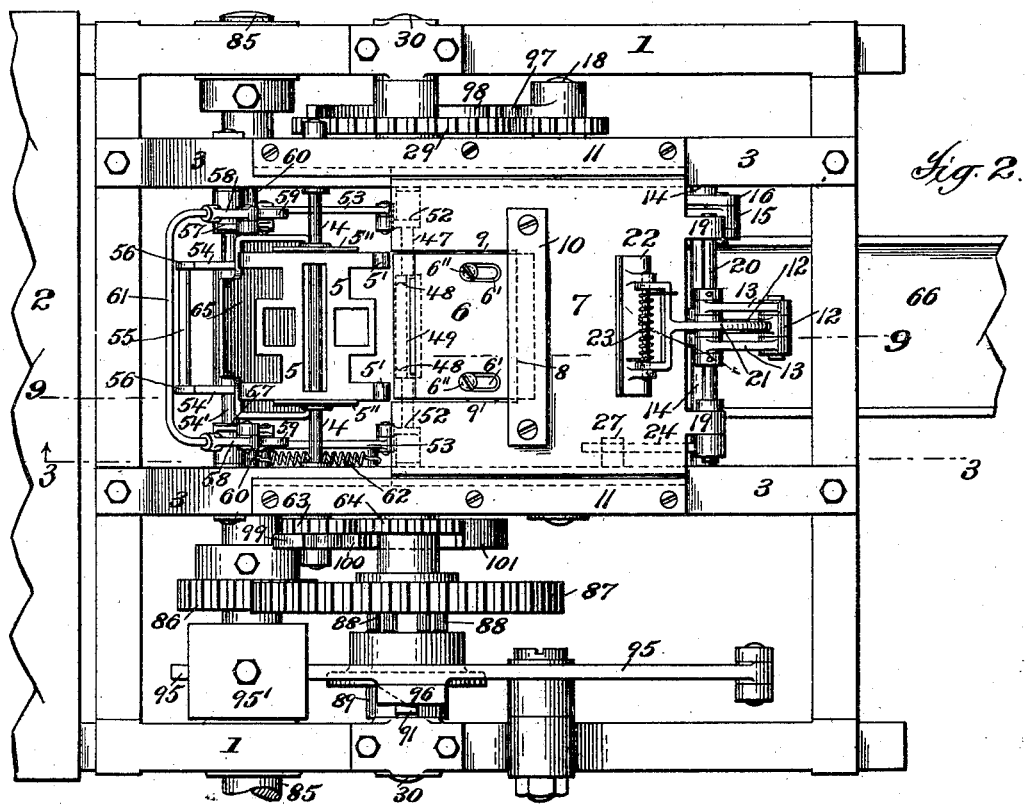
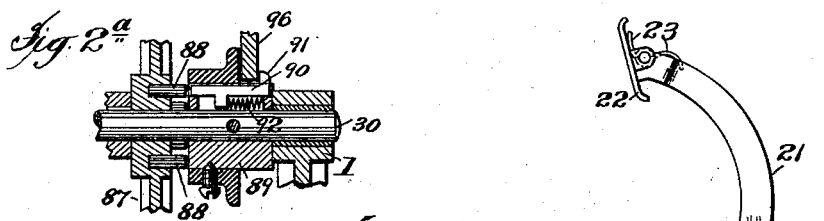
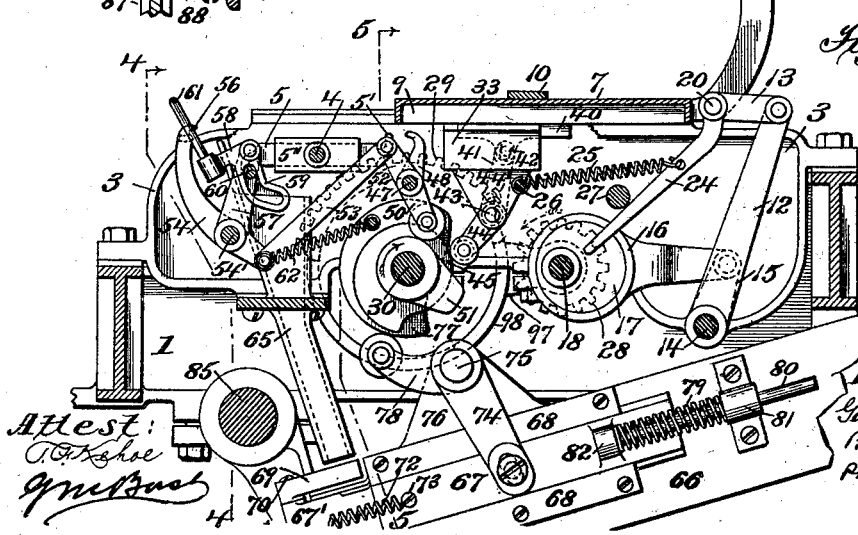

No. 679,811. Patented Aug. 6, 1901.
G. M. WILLIAMS.
MACHINE FOR BOXING CIGARETTES.
(Application filed Mar. 14, 1899. Renewed Dec. 19, 1900.)
(No Model.) 6 Sheets—Sheet 3.
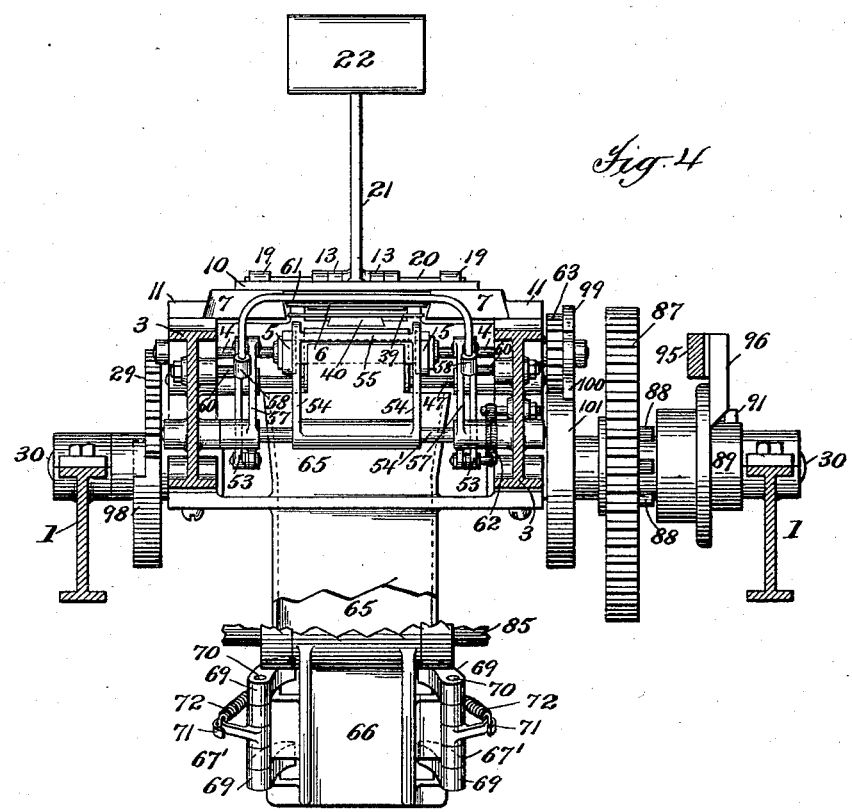
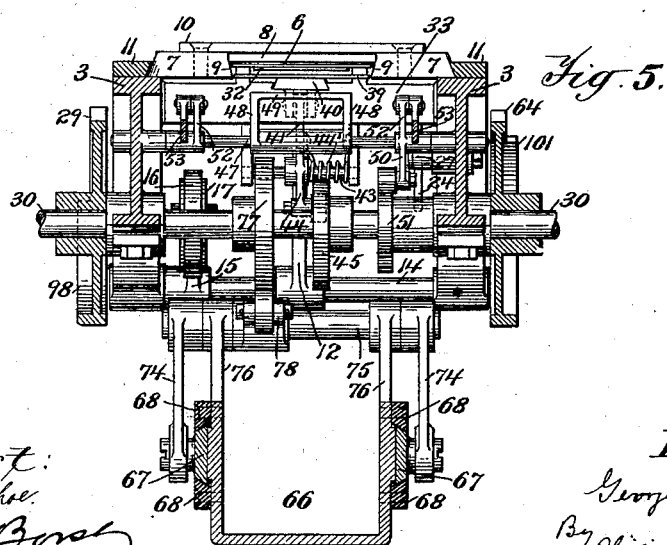

No. 679,811. Patented Aug. 6, 1901.
G. M. WILLIAMS.
MACHINE FOR BOXING CIGARETTES.
(Application filed Mar. 14, 1899. Renewed Dec. 19, 1900.)
(No Model.) 6 Sheets—Sheet 4.
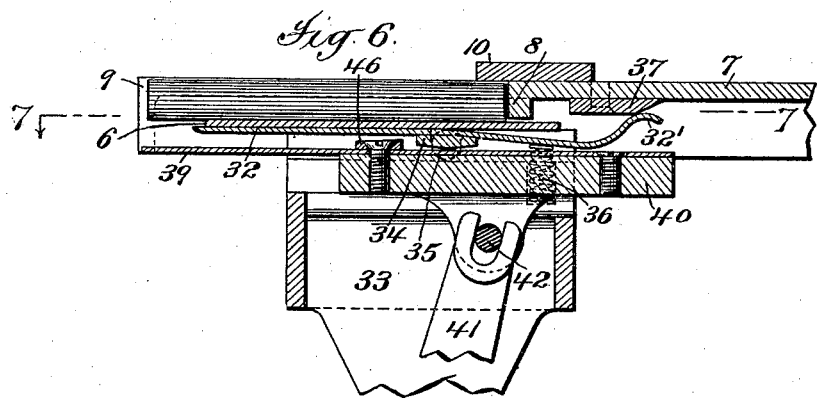
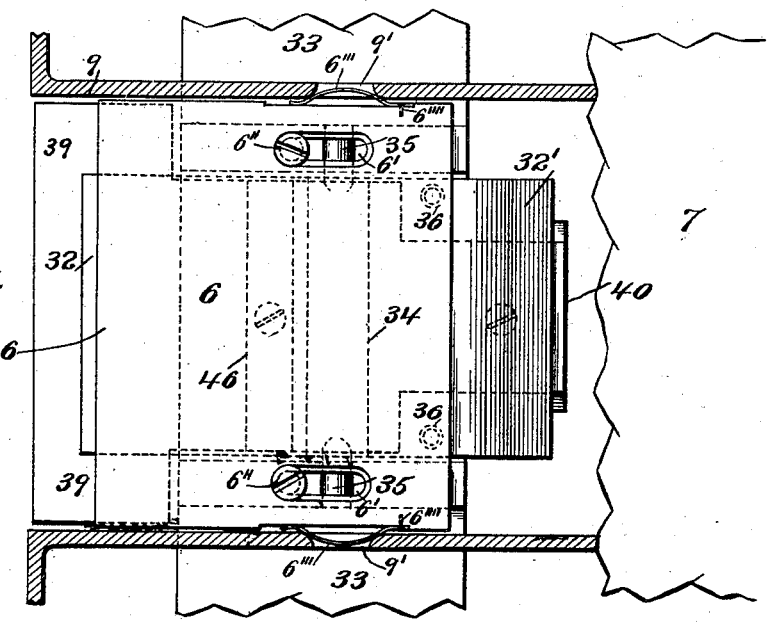
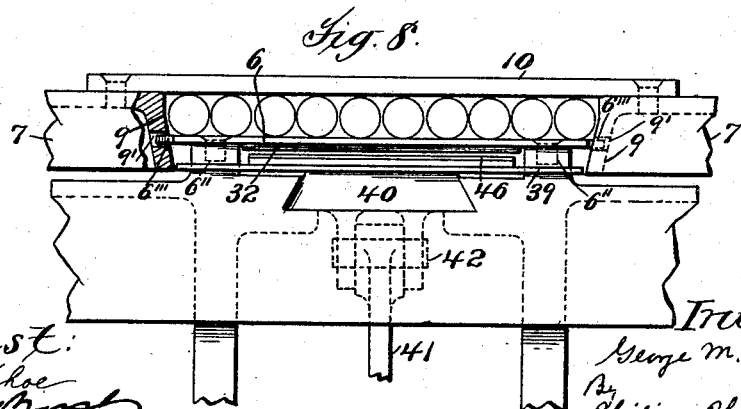
Attest:
T. F. Kehoe
[signature]
Inventor
George M. Williams
By Philip Phelps Sawyer
Attys.
THE NORRIS PETERS CO., PHOTO-LITHO., WASHINGTON, D. C.

No. 679,811. Patented Aug. 6, 1901.
G. M. WILLIAMS.
MACHINE FOR BOXING CIGARETTES.
(Application filed Mar. 14, 1899. Renewed Dec. 19, 1900.)
(No Model.) 6 Sheets—Sheet 5.
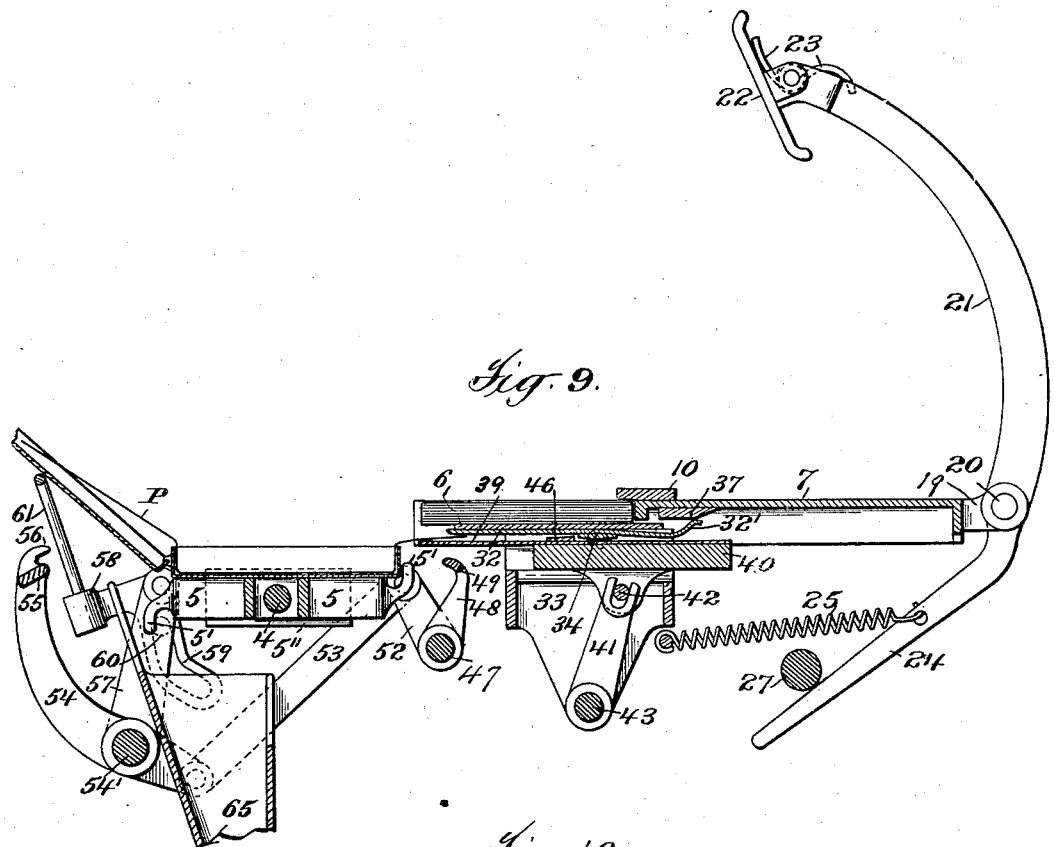
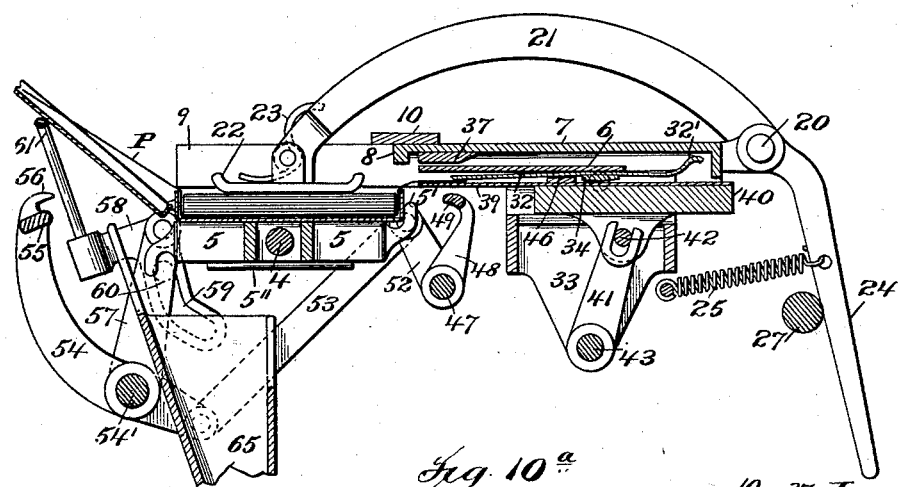

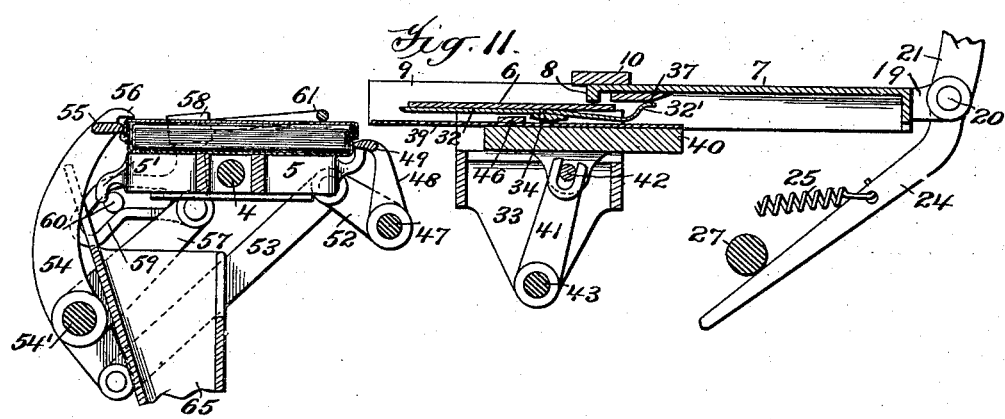

UNITED STATES PATENT OFFICE.

GEORGE M. WILLIAMS, OF BALTIMORE, MARYLAND, ASSIGNOR TO THE AMERICAN TOBACCO COMPANY, OF NEW JERSEY.

MACHINE FOR BOXING CIGARETTES.

SPECIFICATION forming part of Letters Patent No. 679,811, dated August 6, 1901.

Application filed March 14, 1899. Renewed December 19, 1900. Serial No. 40,408. (No model.)

*To all whom it may concern:*

Be it known that I, GEORGE M. WILLIAMS, a citizen of the United States, residing at Baltimore city, in the State of Maryland, have invented certain new and useful Improvements in Machines for Boxing Cigarettes, fully described and represented in the following specification and the accompanying drawings, forming a part of the same.

This invention relates to certain improvements in machines for boxing cigarettes and other similar articles. Cigarettes, and more particularly the all-tobacco cigarettes which are now well known to the trade, are usually incased in metal boxes having hinged lids. These cigarettes are placed and arranged in the boxes with a strip of paraffined or other paper around them, after which the boxes are closed by hand. This is a comparatively slow process and in order to box any considerable number of cigarettes the services of skilled operators are required.

It is the purpose of this invention to produce a machine which shall place the cigarettes in the boxes in which the strip of paper referred to has first been placed, shall properly even and arrange them in the boxes, and then shall close and deliver the boxes, the machine being intended to supersede the hand labor heretofore employed for this purpose.

With these and other objects in view the invention consists in certain parts, improvements, and combinations, as will be hereinafter described, and then pointed out in the claims hereunto appended.

In the accompanying drawings, forming a part of this specification, in which like characters of reference indicate the same parts, Figure 1 is a side view of the machine, the power-shaft of the machine being shown in section. Fig. 2 is a top plan view of the working parts of the machine. Fig. 2ª is a detail of a part of the clutch mechanism. Fig. 3 is a section on the line 3 3 of Fig. 2 looking in the direction of the arrow. Fig. 4 is a sectional front elevation, the plane of section being indicated by the broken line 4 4 in Fig. 3. Fig. 5 is a section on line 5 5 of Fig. 3, certain parts being omitted. Figs. 6, 7, and 8 are detail views, on an enlarged scale, showing the operation of the mechanism for placing cigarettes in the boxes. Fig. 9 is a diagrammatic sectional view, the section being taken on the line 9 9 of Fig. 2, illustrating a box in position in the machine and the parts in the position they assume as the cigarettes are about to be placed in the box. Fig. 10 is a view similar to Fig. 9, with the parts in the position which they assume when the cigarettes have been placed in the box and the packer-arm has descended to even the cigarettes. Fig. 10ª is a detail illustrating the operation of the mechanism for turning in the front edge of the paper wrapper. Fig. 11 is a detail view, the parts being in the position which they assume when the box-cover is closed. Figs. 12, 13, and 14 are details illustrating the operation of the delivery mechanism.

Referring to the drawings, the frame of the machine is indicated at 1, and, in addition to the parts of the machine to be hereinafter described, the frame supports a table 2, on which the cigarettes, boxes, and wrappers used by the operator are or may be placed. On the front and rear bars of the machine-frame 1 rests a pair of inner side frames 3. Journaled in the side frames 3 is a shaft 4, which carries a box-support 5. This support may be of any suitable or desired configuration, so long as it forms a firm support for the box; but it is preferably formed so that two of its opposite sides form box-supports. The boxes are placed on one side of this support while the cigarettes are being placed therein and the boxes are being closed, after which the support is caused to make a half-revolution by mechanism which will be hereinafter described, which delivers the boxes and at the same time brings the other side of the support into position to receive a fresh box. The support 5 is provided on opposite sides with a pair of stops 5' and side plates 5", which act to properly position the box on the support.

6 indicates a table of generally rectangular outline, on which the cigarettes to be boxed are placed before they are put into the box. This table is mounted to have a limited movement toward and from the box-support. While the table may be mounted in various ways to effect this result, it is preferably slotted, as shown at 6', and is secured in position by screws 6", which pass through the slots and which engage brackets 33, extending inward from the said frames 3.

Coöperating with the table 6 is a pusher-slide 7, which operates to transfer the cigarettes from the table 6 to the box. This slide is provided with a depending front wall 8 and depending side walls 9. The two side walls 9 are located alongside the side edges of the table 6, and thus inclose it on two sides. The front wall 8 is shorter than the side walls 9 and reciprocates to and fro over the table. The construction and arrangement of these parts are well shown in Fig. 6. The pusher-slide 7 also preferably carries a top bar 10, which is secured to the said slide so as to project slightly over the front pusher-wall 8. It therefore partly bridges or covers the opening which is bounded by the two side walls 9 and the front wall 8 and overlies the inner ends of the cigarettes which are on the table. It thus assists in preventing any displacement of the cigarettes as they are transferred from the table to the box.

The pusher-slide 7 is guided in its movement by ways, which may be formed in any suitable way. Preferably, however, these ways will consist of side bars 11, secured by screws or in any other suitable manner to the side frames 3. The pusher-slide may be operated to transfer the cigarettes to the box by any suitable mechanism. In the machine shown the slide is operated by a lever 12, which is connected to the slide by links 13. The lever 12 is mounted on a rock-shaft 14, which is suitably journaled in the side bars 3, and is provided with an arm 15. (Clearly shown in dotted lines in Fig. 3.) This arm 15 is connected to an eccentric-strap 16, which surrounds an eccentric 17, carried on a shaft 18, which is journaled in the side frames 3. It is obvious that a rotation of the eccentric will rock the shaft 14 and cause the pusher-slide to move forward, thus transferring the charge of cigarettes on the table 6 to the open box which is resting on the support 5.

The cigarettes being placed on the table 6, as before stated, with their inner ends under the bar 10, and being surrounded on three sides by the flanges of the pusher-slide, are held in proper position to be truly deposited in the box. In order that the cigarettes may be properly delivered into the box, it is desirable that the forward edge of the table 6 at the time of the delivery of the cigarettes be in or nearly in the same vertical plane as the front edge of the box, and it is for this reason that the table is given the limited movement before referred to. While this limited movement may be produced in various ways, it is preferably effected through the pusher-slide. The slide and table are, therefore, so connected that as the pusher-slide starts on its movement toward the box the table 6 will move with it until its front edge comes into or nearly into the same plane with the edge of the box. The connection between the slide and the table so that this movement can be effected may be made in various ways. In the machine shown the table carries light springs 6''', the springs being connected to the table at one end by pins 6''''. The springs 6''' are bowed, as shown, and extend into openings 9' in the side walls 9 of the pusher-slide. It is obvious, therefore, that as the pusher-slide starts on its movement toward the box, the parts being then substantially in the position indicated in Fig. 7, the table 6 will move with the slide until the pins 6'' strike the slots 6'. When the pins come against the rear edges of the slots, as stated, the movement of the table is stopped, the parts being then substantially in the position indicated in Fig. 10. The pusher-slide then continues its movement and delivers the cigarettes, the springs 6''' flattening out, and thus come out of the openings 9'.

While in the preferred construction the table 6 is made movable, as before described, it may, if desired, be stationary, in which case it will be made long enough to extend out nearly to the vertical plane which contains the front edge of the box. It has been found in practice, however, that a table of this length interferes somewhat with the proper positioning of the paper strip to be hereinafter described, and it is therefore regarded as the better construction to make the table shorter and provide for the limited movement.

It may happen that the cigarettes will become slightly disarranged as they pass, under the action of the pusher-slide, from the table to the box, and in order that they may be evened up, if necessary, and also to press them down into the bottom of the box there is preferably provided an evening and packing device.

The evening and packing device may be constructed and operated in any suitable manner. Preferably, however, the pusher-slide is provided with ears 19, in which is journaled a rock-shaft 20. This rock-shaft 20 carries an arm 21, which in turn carries a pivoted presser-plate 22. This presser-plate 22 has a limited movement with respect to the arm 21, the movement being controlled by a light spring 23, which is coiled around the pivot of the plate and has its ends bearing against the plate and arm in an obvious manner.

In order to rock the shaft 20 and cause a movement with arm 21, various devices may be provided. Preferably, however, the shaft 20 carries an arm 24, which is connected to a stud or pin 26, suitably located on the frame of the machine by a spring 25. Another stud 27 is also located on the frame of the machine in the path of the arm 24. It is obvious that as the eccentric 17 is rotated the lever 12 will cause the pusher-slide to advance over the table and at the same time the rock-shaft 20 will be caused to turn by reason of the engagement of the arm 24 with the pin 27. This will cause the arm 21, carrying the presser-plate 22, to descend, and at same time when the pusher-slide has reached its extreme forward movement and has deposited the cigarettes in the box the arm 21 will have brought the plate 22 into contact with the cigarettes, thus evening them in the box and pushing them into place therein, this position of the parts being clearly shown in Fig. 10. It is obvious that the front end of the plate 22 will strike the cigarettes first; but as the spring 23 is a light spring it will permit the plate to rock slightly on its pivots, and thus assume the position shown in Fig. 10, enabling it to press the cigarettes completely home into the box. As the pusher-slide retreats the spring 25 will rock shaft 20 and cause the arm 21 to be raised into the position shown in Fig. 3.

The shaft 18, which carries the eccentric 17, may be rotated in various ways. Preferably, however, this shaft is provided with a gear-wheel 28, which is located just outside one of the side frames 3. This gear-wheel 28 is engaged by a mutilated gear 29, which is carried on a shaft 30, which shaft is rotated, in a manner to be hereinafter described, from the power-shaft of the machine. The mutilated gear 29 has sufficient teeth to cause one complete rotation of the eccentric-shaft 18. The engagement of the two gears, therefore, will be sufficient to cause a complete actuation of the parts so far described—that is, cause them to move from the position shown in Fig. 3 to the position shown in Fig. 10 and then back again to the position shown in Fig. 3.

In packing all-tobacco cigarettes it is usual, as has been before stated, to place in the box a wrapper of paraffined or other paper, which is arranged to entirely surround the cigarettes as they lie in the box. After the operator places a box on the box-support 5 there is preferably placed therein a sheet of paper P in the position shown in Fig. 9—that is, one end of the sheet P overlies the cover of the box and the edge of the other end is inserted under the table 6 and beneath one end of a pivoted plate 32, which is supported in the brackets 33 by means of a bar 34, which is provided with journals 35. (See dotted lines in Fig. 7.) The under sides of the bar 34 are cut away slightly, as shown in Fig. 6, in order to permit a slight rocking movement of the bar 34 and the plate 32. The brackets 33 carry light coiled springs 36, which act upon the plate 32 and normally tend to throw its forward end down in a position to clamp the paper against a slide-plate 39, to be hereinafter described. The plate 32 has an upturned end 32', which when the pusher-slide 7 is in its rearward position is struck by a cam 37 carried on the slide. This cam 37 tilts the plate against the stress of the springs 36 into the position shown in Fig. 6, which shows the position of the parts when the edge of the paper is to be placed under the plate 32. As the pusher-slide 7 starts to move forward the cam 37 is carried away from the upturned end 32' of the plate 32, and the springs 36 immediately operate to tilt the plate and throw its forward end down upon the slide-plate 39, thus clamping the paper between the plates 32 and 39, the position of the parts being clearly shown in Fig. 10.

After the cigarettes have been placed in the box and pressed home therein and before the cover is closed it is necessary to fold over upon the cigarettes the end of the paper which has heretofore been described as held between the plates 32 and 39. In order to accomplish this result, the plate 39 is secured to a slide-block 40, which moves in suitable ways formed in the brackets 33. The slide-block 40 is preferably caused to reciprocate by means of an arm 41, which engages a pin 42 on the slide-block, said arm being carried on a short rock-shaft 43, suitably journaled in bearings in depending portions of the brackets 33. The shaft 43 is provided with an arm 44, which is held in contact with a cam 45, carried on the shaft 30, before referred to, by a spring 44'. Before the plate 39 acts to tuck the paper, as has before been described, it is desirable, in order to avoid tearing the paper, to release the end of the paper held between the plates 32 and 39. To effect this, the slide 40 preferably carries a beveled or cam block 46. (See Fig. 6.) As the plate 39 starts forward the block will operate to rock the plate 32 against the tension of the springs 36 and raise it sufficiently to permit the paper to be pulled out from between the plates 39 and 32. The plate 39 by its further movement will then operate to fold the end of the paper over upon the cigarettes in the box, as is indicated in Fig. 10ª. The cigarettes having been placed in the box and the edge of the paper folded over, the machine next operates to close the lid of the box. This box-closing operation may be performed in various ways and by various mechanisms. In the machine shown, however, there is provided a rock-shaft 47, suitably journaled in the side frames 3. This rock-shaft 47 carries a pair of arms 48, which carry and are connected by a presser-blade 49. The shaft 47 is rocked by means of an arm 50, said arm carrying a bowl which lies in the path of a cam-arm 51, carried on the shaft 30, before described. The shaft 47 is further provided with arms 52, which are connected by means of links 53 to the short arms of a pair of box clamping and closing levers 54, carried on a rock-shaft 54', which is suitably journaled in the side frames 3. The box clamping and closing levers preferably carry and are connected by a presser-blade 55 and are further provided with extensions 56, the purpose of which will be hereinafter stated. The shaft 54' is provided with arms 57, and to these arms 57 are pivoted angular levers 58. One end of the angular lever 58 is provided with a cam-slot 59, which engages studs 60, secured to the side frames 3, and the other ends of the angular levers preferably carry a spring-bail 61. When the cam-arm 51 strikes the arm 50, it rocks the shaft 47, and through the arm 52 and the link 53 also rocks the shaft 54'. As the shafts 47 and 54' are thus rocked the arms 54 and 48 are caused to approach the opposite sides of the box, which is held on the box-support 5. At the same time the arms 57 are rocked toward the box and the slots 59 of the angular levers 58, by reason of their engagement with the pin 60, cause the bail 61 to throw forward the cover of the box. The further rocking movement of the shafts 47 and 54' causes the presser-blades 49 and 55, carried by the arms 48 and 54, to engage the opposite sides of the box. The blade 55 is arranged to engage the box just above the hinge, and at the time when the two blades 49 and 55 engage the box the overhanging lips or extensions 56 of the arms 54 extend over the cover of the box above the hinge. When the parts are in this position, a further movement of the shafts 47 and 54' causes the presser-blade 49 to slightly spring or bend in the front of the box, the box being firmly held between the blades 49 and 55, and at the same time the overhanging extensions 56 of the arms 55 press downward and forward on the cover of the box, thus causing its flange to overlap the sprung edge of the box, as shown in Fig. 11, the action being assisted by the spring-bail 61. It may be here remarked, however, that while the spring-bail assists the overhanging lips 56 in their action it is not a necessary part of the machine and may, if desired, be omitted, since the overhanging lips 56 will of themselves usually insure a reliable closing of the box. As soon as the box is closed the shafts 54' and 47 are rocked in the opposite direction through the agency of spring 62, and the arms 54 and 48 with their blades 55 and 49 are moved away from the box. The box being usually made of sheet metal or other flexible material it will be understood that the front portion is slightly resilient. When, therefore, the levers 48 and the blade 49 move away from the front of the box, the front, which has been slightly sprung in, in the manner before described, will spring outward slightly against the flange of the cover, and thus insure that the box will remain properly closed. The box having been closed, as described, the supporting-table 5 is now given a movement to discharge the box. This movement may be effected in various ways. Preferably, however, the shaft 4 is provided with a gear-wheel 63, which engages a mutilated gear 64 on the shaft 30. This mutilated gear has a sufficient number of teeth to give the shaft 4 a half-revolution, thus causing the table 5 to deliver the box. As the top and bottom sides of the table are alike and each side is provided with stops 5', a half-revolution of the table not only discharges the box, but also brings the table into position to permit a fresh box to be placed thereon. After being discharged from the table 5 the filled and closed boxes may be delivered from the machine in any suitable manner. Preferably, however, the boxes slide down a chute 65 into a trough 66, which is suitably supported beneath the machine. This trough 66 is preferably slightly inclined—that is, it has its outer or discharging end slightly higher than its inner or receiving end—and carries a pair of slides 67, which move in suitable guides 68, secured to the sides of the trough. Each of these slides 67 preferably carries a pair of pivoted packing-pawls 69, which extend through slots in the inner ends of the sides of the trough. Each pair of these pawls 69 is preferably mounted on a short vertical shaft 70, which shafts find their bearings in extensions 67' of the slides 67. These shafts 70 are provided with arms 71, said arms being connected by springs 72 to screws 73, carried on the slides 67. The tendency of these springs is to rock the shafts 70 so as to cause the pawls to approach each other; but the movement produced by the springs is limited by the contact of the arms 71 with shoulders 74 on the extensions 67'. It will be noted that the pawls 69 are curved pawls and that consequently the distance between them at the points where they are pivoted is greater than the distance between their outer ends. The slides 67 are moved in one direction by arms 74, which are mounted on a rock-shaft 75, carried in ears 76 on the sides of the trough. The shaft 30 carries a cam 77, which contacts with a bowl on arm 78 on the rock-shaft 75, thus rocking this shaft and moving the slides. The slides are returned by means of springs 79, which surround rods 80, carried by the slides, said springs 79 bearing at one end against collars 81, secured to the sides of the trough, and at the other end against shoulders 82, which are mounted on the slides. When the table 5 is rotated to deliver the box, the slides have been thrown into their forward position by the action of the cam 77, and consequently the pawls 69 have moved forward, thus pushing ahead the boxes in the trough. The box delivered by the rotation of the table slides down the chute 65 and into the trough 66, dropping into the space between the rear ends of the pawl-arms, which is wide enough to admit the box. The eccentric portion of the cam 77 now leaves the bowl on the arm 78, and the springs 79 move the slides 67 rearward, the springs 72 permitting the pawls 69 to rock the shaft 70, and the pawls are thus moved sufficiently to pass the box which has been deposited in the trough. As soon as the pawls have passed the box the springs 72 cause them to move inward and assume a position behind the box. By slightly inclining the trough the boxes are deposited therein at a slight angle to the vertical, and any tendency which the boxes might have, if they were deposited in a vertical line, to fall forward is thus corrected. As the packing-pawls retreat the boxes assume the position shown in Fig. 13. Each advance of the packing-pawls straightens the boxes up into a position at right angles to the base of the trough, as shown in Figs. 12 and 14.

In order that the operator may have time to place a charge of cigarettes on the table 6, it is preferable that the several mechanisms of the machine be operated intermittently. This may be conveniently effected by intermittently rotating the shaft 30, which carries the operating-cams by which the several mechanisms are successively caused to act. This intermittent rotation of the shaft 30 may be effected in various ways; but the machine shown contains an effective form of mechanism for this purpose. The power-shaft 85, which has power applied to it in any well-known manner, as by a belt-wheel, (not shown,) is provided with a gear 86. This gear 86 meshes with a loose gear 87, mounted on the shaft 30. The gear 87 is provided on its outer side with a series of pins 88. The shaft 30 is further provided with a collar 89, which is fast on the shaft. Working through the collar 89 is a spring-pin 90, having an upturned end 91, the pin being normally thrown forward by a spring 92, and when in its forward position the end of the pin 90 lies between any two of the pins 88, before referred to, on the gear-wheel 87. When the pin 90 is in this position, the gear-wheel 87 is locked to the collar 89, and consequently to the shaft 30, and as the gear 87 is a constantly-running gear the shaft 30 will be rotated by it.

The machine is provided with a treadle 93, which is connected, by means of a rod 94, to a lever 95, suitably pivoted on one of the side bars of the frame 1. The forward end of the lever 95 is provided with a weight 95', which normally holds the lever in the position shown in Figs. 1 and 2. The lever 95 carries a block 96, which has its lower edge beveled, as shown in Fig. 1 and in dotted lines in Fig. 2. The beveled edge of the block when the lever 95 is lowered takes behind the upturned end 91 of the spring-pin 90 and forces it outward, thus withdrawing it from between the pins 88. When the operator presses her foot upon the treadle 93, the lever 95 is rocked upward and the block 96 is withdrawn from behind the upturned end 91 of the pin 90. The spring 92 forces the pin 90 forward, so that its end takes between a pair of pins 88, thus locking the shaft 30 to the constantly-running gear 87 and causing the said shaft to revolve and its cams to operate the various mechanisms of the machine.

The machine is so proportioned that one revolution of the shaft 30 will cause the complete cycle of operations to be performed by the machine. As soon, therefore, as the pin 90 has engaged the pins 88 the operator is free to remove her foot from the treadle 93 and the weight 95' rocks the lever 95 downward. Just as the shaft 30 is about to complete a revolution the pin 90 is brought into such position that its upturned end 91 engages the lower beveled edge of the block 96, and as the shaft 30 completes its revolution the pin is drawn back and the gear 87 is released from the shaft, whereupon the shaft ceases to revolve. After the shaft 30 has completed a revolution, as before described, it is desirable that the several working mechanisms of the machine be locked in their normal inoperative position in order that all parts of the machine may be sure to operate in proper time. This locking of the various parts of the machine may be effected in various ways. Preferably, however, the shaft 18, which has been before described as carrying the eccentric 17 and the gear 28, is provided with an arm 97. (See Figs. 2 and 3.) This arm has a curved outer edge and engages with a segment-rim 98, which is carried on the gear 29. The gear 29, it will be remembered, is a mutilated gear carried on the shaft 30 and is provided with only sufficient teeth to cause one revolution of the shaft 18. The segment-rim 98 corresponds in length to the untoothed portion of the gear 29. When, therefore, the shaft 18 has made a complete revolution, the curved portion of the segment-arm 97 is brought into engagement with the rim 98, (see Fig. 3,) and during the further rotation of the shaft 30 and the gear 29 there can be no movement of the shaft 18. The shaft 4, which carries the supporting-table 5, is preferably provided with a similar locking mechanism. Since, however, this shaft makes but a half-revolution, it is provided with two locking-arms, these arms being marked 99 and 100, respectively. These locking-arms 99 and 100 have curved outer ends and engage with a segment-rim 101 on the mutilated gear 64, which, it will be remembered, has only sufficient teeth to cause a half-revolution of the shaft 4, the segment-rim corresponding in length to the untoothed portion of the gear. When, therefore, the shaft 4 has made a half-revolution, either the arm 99 or the arm 100, as the case may be, will engage the segment-rim 101, and during the further revolution of the gear there can be no movement of the shaft 4.

The operation of the machine as a whole will be readily understood from the illustration and the brief description, taken in connection with the preceding specification. The operator having placed an open box with the paper P in position therein on the support 5 and having tucked the forward edge of the paper P beneath the plate 32 places a sufficient number of cigarettes on the table 6 to fill the box. The treadle 93 is then pressed down, releasing the clutch-pin 90, before described, and locking the shaft 30 to the constantly-running gear 87. The shaft 30 begins to turn, the segment-rim 98 passes out of engagement with the arm 97, and the toothed portion of the mutilated gear 29 engages the gear 28. This causes a rotation of the shaft 18 and the eccentric 17 and through the connections before described causes the pusher-slide to move forward, carrying with it the table 6, until the table is stopped by the engagement of the pins 6" with the rear ends of the slots 6', after which the slide moves onward alone and transfers the charge of cigarettes from the table 6 to the open box, the plate 32 being released from the cam 37 and being thrown down to clamp the forward edge of the paper as soon as the slide begins to move. By the time the cigarettes have been deposited in the box the packer-arm 21 and presser-plate 22 descend, evening up the cigarettes in the box and pressing them home in it. As soon as the arm 21 and plate 22 are retracted sufficiently the slide-block 40 moves forward, its cam-block 46 rocks the plate 32, thus releasing the front edge of the paper, and the plate 39 folds the edge of the paper over the cigarettes in the box. The arms 48 and 54, carrying the presser-blades 49 and 55, are now moved forward to engage the box, the cover of which has been previously thrown down by a movement of the arms 58, carrying the spring-bails 61, this movement being effected through the cam-slot 59 and the pin 60. As soon as the blades 55 and 49 engage the box the blade 49 springs in the front edge of the box, and the combined action of the blade 55, the overhanging lip 56, and the bail 61, if used, completes the closing of the box. The arms 48 and 54 now retreat, and the table 5 makes a half-revolution, delivering the filled and closed box into the chute 65. Just prior to this operation the arm 74 is operated by the cam 77 to move forward the slide 67, carrying the packing-pawls 69. The movement of these packing-pawls advances the boxes which have been already deposited in the trough 66, thus making a place for the descending newly-filled and closed box. This box drops into the space in the trough between the rear ends of the pawls 69, and the slides then retreat, carrying with them the pawls 69, which are permitted by the action of the springs 72 to swing outward sufficiently to pass the box which has just dropped into the trough. As the last-named operation is completed the rotation of the shaft 30 brings the upturned end 91 of the pin 90 into position to be engaged by the beveled edge of the block 96 and the pin 90 is withdrawn from between the pins 88, thus bringing the machine to a stop, with the parts in position to receive a fresh box and fill and close the same.

The mechanisms by which the various operations which have been described are performed may be widely varied, and while the machine is particularly designed for packing cigarettes it is capable of many other uses. It is to be understood, therefore, that the invention is by no means limited to the specific forms of mechanism which have been described nor to the specific use described; but the invention is to be regarded as generic in its nature and as including such changes and modifications as fall within the spirit and scope of the invention.

What I claim is—

1. In a machine for filling and closing boxes having hinged flanged lids, the combination with a box-support of means for placing the contents in a box, and means for closing down the lid and for bringing the flange thereon into proper engagement with the edge of the box, substantially as described.

2. In a machine for closing boxes, the combination with means for supporting a box having a hinged flanged lid of means for closing down the lid upon the box and for bringing the flange thereon into proper engagement with the box, substantially as described.

3. The combination with a box-support, of means for springing in an edge of the box, and means for placing a flanged cover in position on the box with its flange overlapping said edge, substantially as described.

4. In a machine for filling and closing boxes having hinged flanged lids, the combination with a box-support, of means for placing the contents in the box means for pressing them home therein, and means for pressing the lid down upon the box and for bringing the flange into proper engagement with the edge of the box, substantially as described.

5. In a machine for filling and closing boxes, the combination with a box-support, of means for placing the contents therein, means for evening up and pressing home the contents, means for springing in an edge of the box, and means for placing a flanged cover in position on the box with its flange overlapping the edge, substantially as described.

6. The combination with a movable box-support, of means for springing in an edge of a box resting on the support, means for placing a cover in position with its flange overlapping the edge, and means for moving the support to discharge the box, substantially as described.

7. In a machine for filling and closing boxes, the combination with a movable box-support, of means for placing the contents therein, means for springing in an edge of the box, means for placing a flanged cover in position on the box with its flange overlapping the said edge, and means for moving the support to discharge the box, substantially as described.

8. In a machine for filling and closing boxes, the combination with a box-support, of a table on which the contents are laid, a slide for transferring the contents from the table to the box, a packing device for evening and pressing home the contents of the box, means for springing in an edge of the box, and means for placing a flanged cover in position with its flange overlapping the said edge, substantially as described.

9. In a machine for filling and closing boxes, the combination with a box-support, of a table on which the contents are laid, a slide for transferring the contents from the table to the box, a packing device for evening and pressing home the contents of the box, means for springing in an edge of the box, means for placing a flanged cover in position with its flange overlapping the said edge, and means for delivering the filled and closed box, substantially as described.

10. The combination with a box-support, of a table upon which the articles to be placed in the box are laid, a slide for transferring the articles from the table to the box, a packing and evening device carried by said slide, and means for operating the slide and the packing device, substantially as described.

11. The combination with a box-support, of a table upon which the articles to be placed in the box are laid, a slide surrounding the table on three sides, a packer-arm carried by the slide, means for reciprocating the slide, and means whereby the packer-arm is caused to operate as the slide reciprocates, substantially as described.

12. The combination with a box-support, of a table upon which the articles to be placed in the box are laid, a slide for transferring the articles from the table to the box, a packer-arm pivoted to the slide, an extension on said arm, means for reciprocating the slide and arm, a pin in the path of the extension on the arm, whereby the arm is rocked by contact of the extension with the pin as the slide moves in one direction, and a spring for returning the arm as the slide moves in the opposite direction, substantially as described.

13. The combination with a box-support, of a table upon which the articles to be placed in the box are laid, said table being mounted to have a limited movement, a pusher-slide, and means whereby the pusher-slide and table are caused to move together for a distance and then the slide is caused to move forward alone and deliver the articles from the table, substantially as described.

14. The combination with a box-support, of a table upon which the articles to be placed in the box are laid, the table being mounted to have a limited movement, a pusher-slide, connections between the slide and the table by which the table is given a limited movement by the slide, and means for operating the slide, the slide in its movement being caused to advance after the table has stopped, substantially as described.

15. The combination with a box-support, of a table, means whereby the table is supported, a pin-and-slot connection between the table and its support, a pusher-slide, a slip connection between the pusher-slide and the table whereby the table is given a limited movement, and means for operating the pusher-slide, the slide in its movement being caused to advance after the table has stopped, substantially as described.

16. The combination with a box-support, of a slotted table upon which the articles to be placed in the box are laid, brackets for supporting the table, a pin-and-slot connection between the table and the brackets, bowed springs carried by the table, a pusher-slide, openings in the slide which are engaged by the springs, and means for operating the slide, substantially as described.

17. In a machine for filling and closing boxes, the combination with a box-support having a plurality of supporting sides, of means coöperating therewith to hold the boxes thereon, means for placing the contents in the boxes, means for closing the boxes, said closing means operating while the support is stationary, and means for giving the support a partial rotation between successive filling and closing operations, substantially as described.

18. In a machine for filling and closing boxes, the combination with a box-support having a plurality of supporting sides, of means coöperating therewith to hold the boxes thereon, means for placing the contents in the boxes, means for closing the boxes, said closing means operating while the support is stationary, and means for giving the support a partial rotation between successive filling and closing operations, means for locking the support against movement except during the periods when it is rotated, substantially as described.

19. In a machine for filling and closing boxes, the combination with a rotating box-support having two oppositely-arranged supporting sides and two sets of stops coöperating with said sides, of means for giving the box-support a half-rotation whereby boxes may be successively placed on each side thereof, substantially as described.

20. In an organized machine for filling boxes, the combination with a box-support upon which a box containing a strip of paper may be placed, of means in proximity to the support for holding one edge of the strip of paper, substantially as described.

21. In an organized machine for filling boxes, the combination with a box-support upon which a box containing a strip of paper may be placed, of means for holding one edge of the strip of paper, and means for placing the contents of the box in position, substantially as described.

22. In an organized machine for filling boxes, the combination with a box-support upon which a box containing a strip of paper may be placed, of means for placing the contents of the box in position, and means for folding one edge of the strip of paper over said contents, substantially as described.

23. In an organized machine for filling boxes, the combination with a box-support upon which a box containing a strip of paper may be placed with a part of the paper overlying the cover of the box and an edge projecting beyond a side of the box, of means for placing the contents of the box in position, means for folding the edge of the paper over said contents, and means for closing down the cover of the box and thus folding down the remainder of the strip of paper over the contents, substantially as described.

24. The combination with a box-support, of a table upon which the contents of the box are placed, a spring-clamp for holding one edge of a strip of paper placed in the box, a slide for transferring the contents from the table to the box, means carried by the slide for releasing the clamp and causing it to grip the paper, and a second slide for folding the edge of the paper over onto the contents of the box, substantially as described.

25. The combination with a box-support, of a table upon which the contents of the box are placed, a spring-clamp for holding one edge of a strip of paper placed in the box, a slide for transferring the contents from the table to the box, means carried by the slide for releasing the clamp and causing it to grip the paper, a second slide for folding the edge of the paper over onto the contents of the box, and means carried by said slide for releasing the clamp prior to the folding operation, substantially as described.

26. The combination with a box-support whereon a box having a hinged cover is placed with a strip of paper overlying the cover of the box and an edge projecting beyond a side of the box, of means for placing the contents in the box, a clamp thrown into operation by said means for holding the edge of the strip of paper, a folding device, means operated by the folding device for releasing the clamp, and means for closing down the cover of the box and thus folding over the remainder of the strip of paper, substantially as described.

27. In a machine for closing boxes having hinged flanged lids, the combination with a box-support, of clamping devices acting against two sides of the box and devices for closing down the hinged lid so that the flange thereon will be in engagement with the edge of the box, substantially as described.

28. In a machine for filling boxes, the combination with a box-support constructed to hold a box having a hinged flanged lid of a pair of blades acting against the front and rear sides of the box and means operating in connection with the blades to close down the lid and bring the flange into proper engagement with the edge of the box, substantially as described.

29. In a machine for filling and closing boxes, the combination with a box-support of a blade acting against one side of the box and below the edge thereof to press the same inward, means for operating the blade and means acting in opposition to the blade on the opposite side of the box, substantially as described.

30. The combination with a box-support, of a blade acting against the rear side of the box, means for supporting and operating such blade, and lid-closing devices carried by said supporting and operating means, substantially as described.

31. The combination with a box-support, of a blade for acting against one side of the box, means for supporting and operating said blade, a second blade acting against the opposite side of the box, a pair of arms by which said second blade is carried, said arms having hooked extensions which act as lid-closing devices, substantially as described.

32. The combination with a box-support, of a shaft, a pair of arms on said shaft, a blade for acting on one side of the box carried by said arms, a second shaft, a pair of arms on said second shaft, hooked extensions forming lid-closing devices on said arms, a second blade for acting against the rear side of the box carried by said arms, and means for rocking the shafts, substantially as described.

33. The combination with a box-support, of a shaft, a pair of arms on said shaft, a blade for acting on one side of the box carried by said arms, a second shaft, a pair of arms on said second shaft, hooked extensions forming lid-closing devices on said arms, a second blade carried by said arms for acting against the opposite side of the box, means for rocking one of the shafts, and connections between the two shafts whereby the rocking movement of one shaft is transmitted to the other, substantially as described.

34. The combination with a box-support, of means for acting against one side of the box, means for acting against the opposite side of the box, said means including a pressing device, lid-closing devices connected to said means, and a supplemental lid-closing device, substantially as described.

35. The combination with a box-support, of a blade for acting against one side of the box, means for supporting and operating the blade, a second blade, a pair of arms by which it is supported, hooked extensions on the arms forming lid-closing devices, and a supplemental lid-closing device, substantially as described.

36. The combination with a box-support, of means for springing in one edge of a box resting on the support, means for acting on the opposite side of the box, the box being held between the two sets of means, and lid-closing devices carried by the means which act on the rear side of the box, substantially as described.

37. The combination with a box-support, of means for springing in one edge of a box resting on the support, means for acting on the opposite side of the box, the box being held between the two sets of means, lid-closing devices carried by the means which act on the rear side of the box, and a supplemental lid-closing device, substantially as described.

38. The combination with a box-support, of a pair of shafts located in proximity thereto, devices carried by the shafts for acting on the two sides of the box, lid-closing means carried by one set of devices, a supplemental lid-closing device, connections between the shafts, and means for operating one of the shafts, substantially as described.

39. The combination with a box-support, of a pair of shafts located in proximity thereto, devices carried by the shafts for acting on two sides of the box, lid-closing means carried by the devices on one side of the box, a spring-bail acting as a supplemental closing device, and means whereby said spring-bail is operated from one of the shafts, substantially as described.

40. The combination with a delivery-trough for receiving filled boxes, of advancing devices operating against the rear side of the boxes, means for depositing boxes in the space caused by advancing the boxes in the trough, and means whereby the advancing devices are permitted to pass around the boxes so deposited as they are withdrawn after finishing their advancing movement, substantially as described.

41. The combination with a delivery-trough for receiving filled boxes, said trough having its delivery end higher than its receiving end, of advancing devices operating against the rear side of the boxes, means for depositing boxes in the space caused by advancing the boxes in the trough, and means whereby the advancing devices are permitted to pass around the boxes so deposited as they are withdrawn after finishing their advancing movement, substantially as described.

42. The combination with a trough for receiving filled boxes, said trough having its delivery end higher than its receiving end, of a pair of slides mounted on the trough, pivoted advancing devices for the filled boxes carried by the slides, said devices being farther apart at their rear than at their operating ends, means for operating the slides and thus causing the advancing devices to move forward the boxes in the trough, and means for delivering the filled boxes into the trough behind the operating ends of the advancing devices, substantially as described.

43. The combination with a trough, of a pair of slides carried thereby, pivoted advancing devices carried by the slides, said devices being farther apart at their pivotal points than at their operating ends, springs operating to force the operating ends of the advancing devices toward each other, and means for reciprocating the slides, substantially as described.

44. The combination with a trough having its delivery end higher than its receiving end, of a pair of slides carried thereby, a shaft pivoted in each slide, pawls pivoted to the shafts, said pawls being farther apart at their pivotal points than at their operating ends, arms on the shafts, springs connected to the arms and slides and operating to force the pawls toward each other, and means for reciprocating the slides, substantially as described.

45. In a machine for filling and closing boxes, the combination with a box-support, of a table on which the contents of the box are laid, devices for transferring the contents from the table to the box, a pressing and evening device, lid-closing devices, a cam-shaft, means for revolving the shaft, means whereby the shaft is brought to a stop after each revolution, and cams on the shaft for successively causing the operation of the transferring, pressing and evening, and lid-closing devices, substantially as described.

46. In a machine for filling and closing boxes, the combination with a rotating box-support, of a table on which the contents of the box are laid, a transferring device, lid-closing devices, a cam-shaft, means for revolving the shaft, means whereby the shaft is brought to a stop after each revolution, and cams on the shaft for causing the successive operation of the transferring and lid-closing devices and the rotation of the support, substantially as described.

47. In a machine for filling and closing boxes, the combination with a rotating box-support, of a table on which the contents of the boxes are laid, a transferring device, a pressing and evening device, lid-closing devices, a cam-shaft, means for revolving the shaft, means for bringing the shaft to a stop after each revolution, and cams on the shaft for causing the successive operation of the transferring, pressing and evening, and lid-closing devices, and the rotation of the box-support, substantially as described.

48. In a machine for filling and closing boxes, the combination with a rotating box-support, of a table on which the contents of the boxes are laid, a transferring device, a pressing and evening device, lid-closing devices, a cam-shaft, means for rotating the shaft, means for bringing the shaft to a stop after each revolution, cams on the shaft for causing the successive operation of the transferring, pressing and evening and lid-closing devices, and the rotation of the box-support, and means for locking one of said devices against movement except at predetermined times, substantially as described.

49. In a box filling and closing machine, the combination with a rotating box-support, of a table on which the contents of the boxes are laid, a transferring device, a pressing and evening device, lid-closing devices, devices for delivering the filled boxes out of the machine, a cam-shaft, means for rotating the shaft, means for bringing the shaft to a stop after each revolution, and cams for causing the successive operation of the transferring, packing and lid-closing devices, the rotation of the support and the operation of the delivery devices, substantially as described.

50. In an organized machine for filling and closing boxes having hinged flanged lids, the combination with a box-support, of means for supporting the contents of the boxes prior to their insertion thereinto, means for transferring said contents into the boxes, means for closing down the lids of the boxes so that their flanges will be in engagement with the edges of the boxes, and devices for delivering the closed boxes, substantially as described.

In testimony whereof I have hereunto set my hand in the presence of two subscribing witnesses.

GEORGE M. WILLIAMS.

Witnesses:
R. L. PATTERSON,
WM. H. JONES.